United States Patent [19]

Chartier

[11] 4,229,882
[45] Oct. 28, 1980

[54] CUTTER HEAD AND CUTTERS FOR A VEGETATION CUTTING TOOL

[76] Inventor: Eldrick D. Chartier, Box 214, Yoncalla, Oreg. 97499

[21] Appl. No.: 946,364

[22] Filed: Sep. 27, 1978

[51] Int. Cl.³ .................... A01D 55/18; A01G 3/06
[52] U.S. Cl. ............................... 30/276; 56/12.7
[58] Field of Search .............. 30/276, 347; 56/12.7, 56/17.5, 295

[56] References Cited

U.S. PATENT DOCUMENTS

| 2,663,137 | 12/1953 | Asbury | 30/347 X |
| 2,707,859 | 5/1955 | Walker | 56/295 |
| 3,611,691 | 10/1971 | Howard | 56/295 |
| 4,062,115 | 12/1977 | Lee | 30/276 |

Primary Examiner—Jimmy C. Peters

[57] ABSTRACT

A rotary cutter head for attachment to the powered shaft of a cutting tool. Flexible wire cutters are irregular shape so as to engage abutments formed on the cutter head. The wire cutters may flex along a relatively long segment to prevent cutter damage. Cutter heads are disclosed with abutments for mounting different numbers of cutters.

9 Claims, 10 Drawing Figures

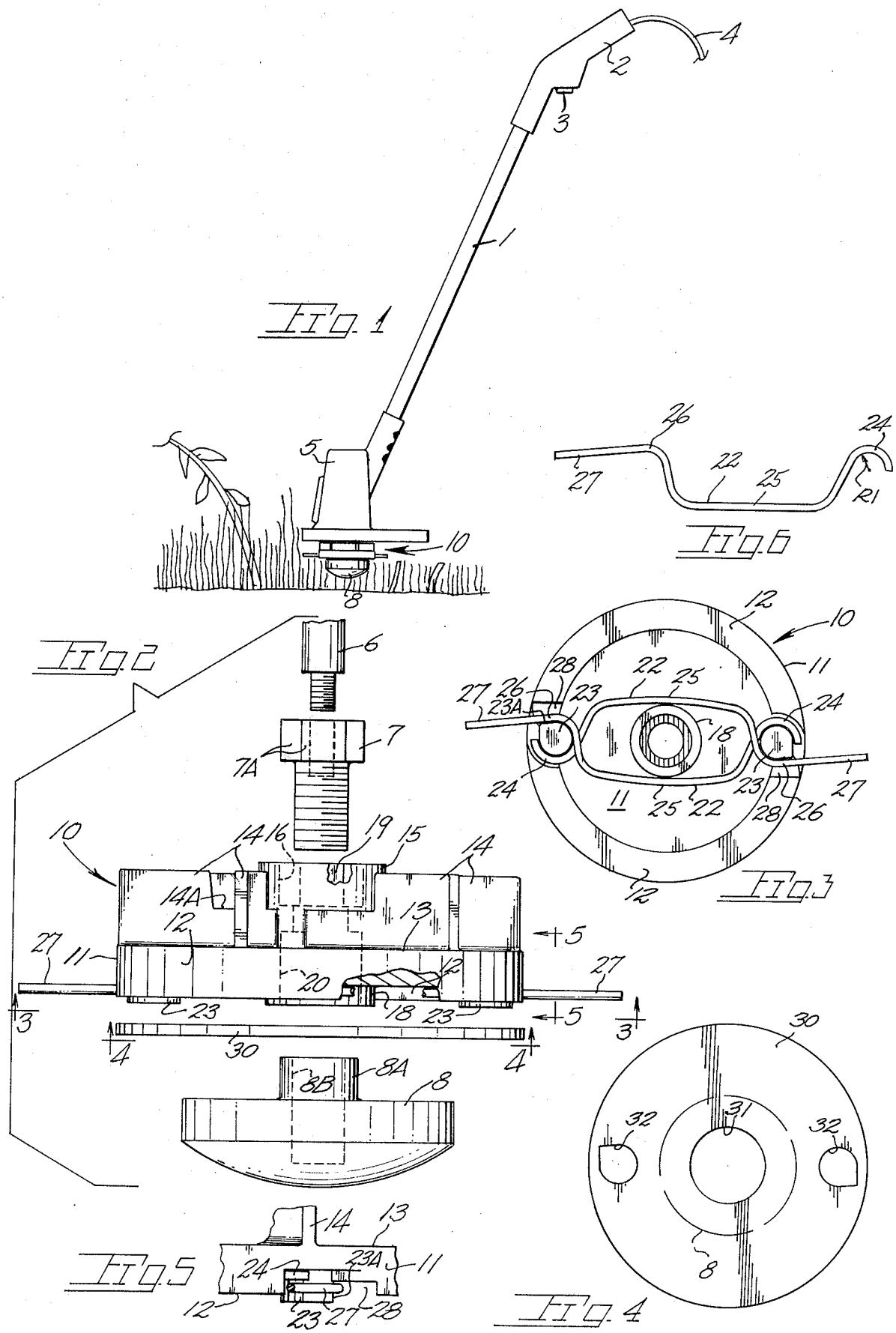

U.S. Patent  Oct. 28, 1980  Sheet 2 of 2  4,229,882
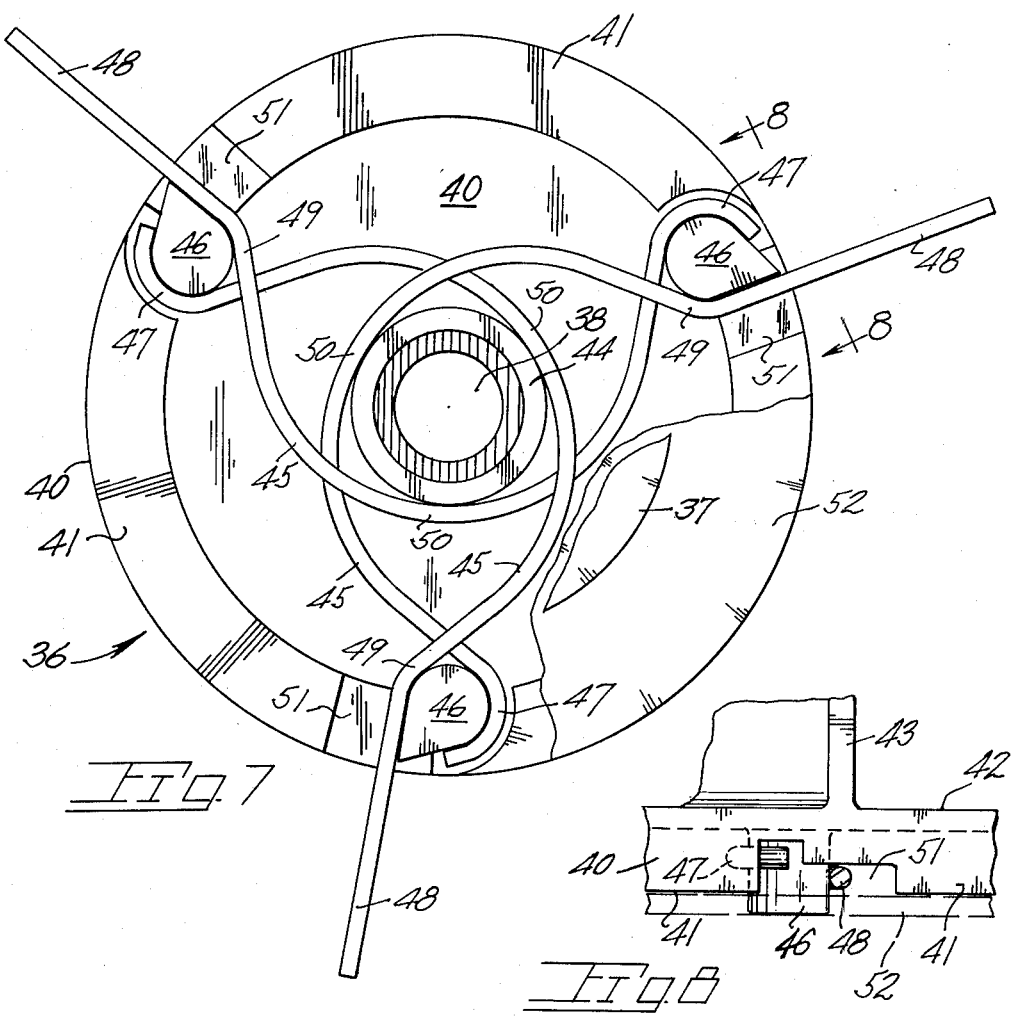
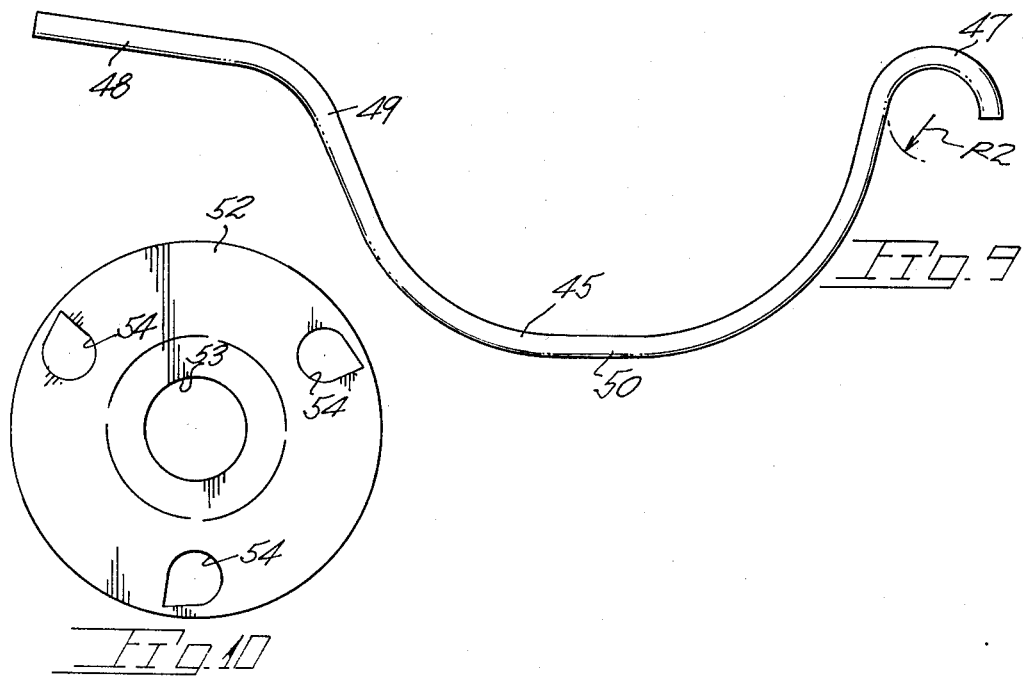

CUTTER HEAD AND CUTTERS FOR A VEGETATION CUTTING TOOL

BACKGROUND OF THE INVENTION

The present invention pertains generally to that class of powered, rotary cutting apparatus used in trimming grass and undergrowth.

Highly portable powered tools are presently in wide use for the cutting of vegetation such as grass and weeds. Such tools utilize a highly flexible element, usually of monofilament construction, as a cutting element. A rotating head, powered by an electrical motor or small gas engine, carries a spool of wound line with the trailing ends of the line exposed for contact with the vegetation being cut. The cutting action is derived largely from the trailing end of the line which action is suitable for cutting grass and weeds.

Use of the presently marketed tools is somewhat restricted in that the monofilament line does not sever heavy undergrowth such as berry vines, large weeds, seedlings, etc.

Tools of the above type are covered under U.S. Pat. Nos. 3,826,068; 3,708,967 and 3,859,776 which recitation is not alleged to be a complete list of relevant prior art.

Rotary cutting tools using wire cutting elements are shown in U.S. Pat. Nos. 2,707,859; 2,762,188; 3,018,602; 3,190,064 and 3,303,637 of which I am aware.

SUMMARY OF THE PRESENT INVENTION

The present invention is embodied within a novel cutter head adapted for attachment to an existing tool of the above mentioned class which cutter head includes novel semi-rigid cutters.

The cutter head carries replaceable cutters which project outwardly in a generally radial manner. Open areas in the head enable flexing of the cutters upon heavy cutting loads being encountered. Retention means for the cutters permit same to be individually replaced without the aid of hand tools. To enhance cutter resiliency, the same may bend about a fulcrum located substantially medial of cutter length. Further, said retention means embodies a removable closure plate for cutter access and multiple abutments against which the cutters rest.

Important objectives of the present invention include the provision of a low maintenance cutter head for attachment to the output shaft of a prime mover, either electric or an internal combustion engine, which cutter head carries multiple wire cutters which may flex during cutting contact with vegetation; the provision of a powered cutter head which is compatible with existing tool components to enable convenient installation of the present cutter head thereon; the provision of a cutter head including retention means which prevents separation of a cutter from the cutter head to avoid risk to the user; the provision of a cutter head utilizing cutters of semi-rigid, flexible wire construction configured to engage the retention means in a positive, supported manner; the provision of a cutter supported by multiple, spaced apart abutments and adapted for flexing upon encountering an obstruction.

BRIEF DESCRIPTION OF THE DRAWINGS

In the accompanying drawings:

FIG. 1 is a side elevational view of a tool for cutting vegetation with the present cutter head attached;

FIG. 2 is an exploded side elevational view of the present cutter head;

FIG. 3 is a view taken upwardly along line 3—3 of FIG. 2;

FIG. 4 is a view taken upwardly along line 4—4 of FIG. 2;

FIG. 5 is a fragmentary elevational view taken along line 5—5 of FIG. 2;

FIG. 6 is a plan view of a cutter removed from the cutter head;

FIG. 7 is a bottom plan view of a modified cutter head with the closure plate and retainer broken away for purposes of illustration;

FIG. 8 is a fragmentary elevational view of the parametrical wall of the modified cutter head;

FIG. 9 is a plan view of a cutter removed from the modified cutter head; and

FIG. 10 is a bottom plan view of a closure plate of the modified cutter head shown on a reduced scale.

DETAILED DESCRIPTION OF THE PREFERRED EMBODIMENTS

With continuing attention to the accompanying drawings, the reference numeral 1 indicates a tubular handle of a powered hand tool used for cutting vegetation such as grass, weeds and various types of light undergrowth. A hand grip 2 includes motor control 3 in circuit with a power source via an electrical cord 4. A motor housing at 5 conceals an electric motor. A motor output shaft 6 (FIG. 2) is suitably coupled to a later described cutter head comprising the present invention. The foregoing described tool is of the hand held type and includes an electric motor while similar tools, with which the present cutter head is compatible, may be of somewhat different configuration and may alternately include small internal combustion engines as prime movers. To the extent the prior art is known such tools rely on monofilament line or a rigid cutting plate for their cutting action. Some flail type cutters are also utilized.

The present invention is embodied within a cutter head indicated generally at 10 which is coupled to motor driven shaft 6 to partake of shaft rotation at a high R.P.M. One coupling arrangement heretofore used includes a combination retainer and drive stud 7 and a threaded retainer 8. Accordingly, cutter head 10 shown as using such an arrangement is readily adaptable to mounting on existing tools. Other coupling arrangements may be provided without departing from the scope of the invention to render the present cutter head conveniently mountable on other types of rotary cutting tools.

Cutter head 10 includes a main body 11 having a perimetrical wall 12 and a top wall 13. In place on top wall 13 are fins 14 disposed in a chordally offset manner relative the base axis so as to constitute the blades of a fan for pulling a cooling flow of air inwardly and downwardly into motor housing 5. The blades 14 are relieved at 14A adjacent their inner extremities. Centrally disposed of body 11 is a boss 15 defining at its upper end a drive aperture 19 defined internal walls 16 which receive the flats 7A of drive-retainer stud 7. Concentric with boss 15 is a boss 18 integral with the underside of body 11 and which defines an upward opening 20 communicating with drive aperture 19. Opening 20 receives retainer 8 and specifically a boss 8A thereon which defines an internal threaded bore 8B which threadingly engages retainer drive stud 7 when the latter is disposed within opening 20. Accordingly with drive stud 7 in threaded attachment to motor output shaft 6 and with the flats 7A of drive stud 7 abutting walls 16 motor rotation is imparted to the cutter head body with retainer 8 preventing downward separation. Retainer 8 preferably has an irregular surface about its rim to facilitate hand tightening. As earlier noted, drive stud 7 and retainer 8 are used in prior art cutting tools.

With attention again to cutter head 10 and with reference to FIG. 3, the underside of body 11 embodies cutter retention means to removably mount flexible cutters 22. Cutters 22 are otherwise usable on prior art cutter heads. Abutments 23 on body 11 engage each cutter at one end thereof and also at an end segment of the cutter. Rotary motion of body 11 is imparted to each cutter 22 by an abutment 23 with the remaining abutment supporting a cutter end segment, retaining said segment in place. Boss 18 consituting an abutment engages a mid-portion of the overlapped cutters and serves as a fulcrum about which a cutter portion may flex upon encountering a cutting load.

One satisfactory type of cutter is constructed of flexible heat treated spring steel wire of approximately 0.120 thousandths of an inch which cutter is satisfactory for cutting grass and undergrowth. With continuing attention to FIG. 6, each cutter is of elongate bowed configuration and comprises an abutment engaging curved or hook shaped end segment 24, a mid portion 25, a displaceable segment 26 with the cutter terminating outwardly in a substantially straight cutting segment 27 which projects from body 11. As viewed in FIG. 5, exposed cutting segment 27 and segment 26 may flex relative to body 11 in a direction opposite to cutter head rotation within a relieved open area 28 formed in body wall 12. Closure plate 30 is centrally bored at 31 receive retainer 8 while plate openings 32 receive the lower portions of abutments 23 during cutter head assembly.

With attention to FIG. 6, the radius at R1 of cutter end 24 is slightly less than the radius of an abutment 23 so as to provide a gripping action when the cutter end is installed about an abutment so as to remain in place while a closure plate 30 is attached to body 11.

Diametrically disposed abutments 23 preferebly include flats at 23A to stabilize the exposed cutter end segment when returning to its normal position. Said end segments flex under a load ranging from five to ten pounds pressure.

A modified cutter head is indicated generally at 36, as shown in FIG. 7, and in similarity to the first described cutter head is adapted for coupling to a motor driven shaft utilizing the same coupling elements heretofore described. A threaded retainer 37 includes a threaded bore (not shown) which extends upwardly into a cutter head opening 38 to engage the retainer and drive stud disposed therein. Cutter head 36 includes a main body 40 having a perimetrical wall 41 and a top wall 42 on which are formed fins 43 disposed, as before, in a chordally offset manner relative the body 40 to provide a motor cooling flow of air. Concentric with main body 40 is a boss 44 which defines opening 38 with boss 44 additionally serving as an abutment of later described retention means to partially support a plurality of cutters 45.

The underside of the body of the modified cutter head embodies cutter retention means which removably mount flexible, bowed cutters 45. Abutments 46 lie in separate true radial planes and are circumferentially spaced about main body 40 each serving a dual purpose by supporting a curved or hook shaped end segment 47 of a cutter and a cutting segment 48 of a remaining like cutter. As in the first form of the invention, rotational force is imparted to cutter end 47 by an abutment 46. Boss 44 of the retention means abuts, generally, the mid-portion 50 of each cutter and serves as a fulcrum about which a displaceable segment 49 and substantially straight exposed cutting segment 48 may move upon encountering heavy cutting loads. Desirably, each abutment 46 has a flat 40A for cutter support.

The cutter used with the modified cutter head is of heavier gauge than the first described cutter, say, 0.150 thousandths of an inch, and is suitable for cutting heavy undergrowth such as vines, large weeds, seedlings, etc.

The cutting segment of each cutter may flex relative to body 40 in a direction opposite to cutter head rotation by reason of a relieved open area 51 formed in the parametrical wall 41 of said body.

Both cutter configurations lie wholly within a plane substantially normal to the axis of cutter head rotation and may be flexed manually into initial abutment engagement. The cutters are overlapped at certain segments.

The radius R2 of curved cutter end 47 is slightly less, approximately 1/32 of an inch, than the corresponding radius of each abutment 46 to effect a gripping action of the cutter end on the abutment.

A closure plate 52 is centrally bored at 53 to receive retainer 37 while plate openings at 54 each receive an abutment 46 during cutter head assembly.

In use, the cutter head is readily installable on existing tools to greatly enhance tool usefulness as a greater range of vegetation may be cut with less maintenance than known cutting tools. Retainer 8 may be removed with closure plate 30 for cutter access which are replaceable without the aid of tools. Each cutter may flex along a relatively long arm to its mid length to preclude premature metal fatigue. The cutter is supported along an abutment surface to prevent cutter rebounding which is also detrimental to cutter life.

In use, the cutters disclosed are attachable to a disclosed cutter head or to the cutter head of widely marketed cutter heads of the type using monofilament line and sold under the registered trademark WEED EATER wherein the abutting structure of the cutting head is significantly different from that presently disclosed.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

I claim:

1. A rotary cutter head for attachment to the driven shaft of a motorized hand supported apparatus for cutting vegetation, said cutter head comprising,
  a flexible metal cutters each of hook shaped configuration at one end and having a substantially straight exposed cutting segment at its opposite end,
  a circular body removably coupled to said shaft, said body including a central boss and radially offset abutments constituting cutter retention means engaging each of said cutters at spaced apart points therealong so as to permit flexure of the cutter along its length to minimize cutter breakage, said cutters in partial overlying relationship with one another, a closure plate for attachment to said main body, and a retainer engageable with said body for closure plate retention.

2. The cutter head claimed in claim 1 wherein some of said abutments are proximate the outer edge of the body.

3. The cutter head claimed in claim 1 wherein each of said offset abutments lies within a separate true radial plane of the body.

4. The cutter head claimed in claim 1 wherein said body includes a perimetrical wall which wall defines open areas extending therethrough within which said cutters may be displaced in a limited manner upon encountering a cutting load.

5. The cutter head claimed in claim 1 wherein each of said abutments depends from said body and includes both curved and flat surfaces for cutter engagement.

6. The cutter head claimed in claim 5 wherein said cutters are of a configuration so as to engage said abutments in a biased manner for retention thereon prior to application of the closure plate to the body.

7. A flexible metal cutter of generally bowed configuration for installation within a rotary cutter head of a vegetation cutting tool having multiple spaced apart abutments thereon and a central boss, said cutter having spaced apart end segments adapted to abut multiple cutter head abutments, one of said segments being of hook shaped configuration for permanent abutment with one of the cutter head abutments, the remaining end segment being substantially straight and in spring biased contact with a remaining abutment.

8. The cutter claimed in claim 7 wherein said cutter includes a mid-portion adapted for contact with a centrally disposed cutter head abutment.

9. The cutter claimed in claim 8 wherein said midportion is bowed for abutting engagement with said centrally disposed cutter head abutment.

* * * * *